(12) United States Patent
Stein et al.

(10) Patent No.: US 7,151,393 B2
(45) Date of Patent: Dec. 19, 2006

(54) HIGH-SPEED WRITE DRIVER

(75) Inventors: Anatoli B. Stein, Atherton, CA (US);
Alex Zolotarev, Sunnyvale, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 27 days.

(21) Appl. No.: 10/982,372

(22) Filed: Nov. 5, 2004

(65) Prior Publication Data
US 2006/0097761 A1    May 11, 2006

(51) Int. Cl.
*H03K 3/00* (2006.01)

(52) U.S. Cl. .................. 327/110; 327/423; 327/589; 360/46

(58) Field of Classification Search ............. 327/110, 327/423, 589; 330/258; 360/46, 67, 68
See application file for complete search history.

(56) References Cited

U.S. PATENT DOCUMENTS

| | | | | |
|---|---|---|---|---|
| 4,879,610 A * | 11/1989 | Jove et al. | .................. | 360/67 |
| 5,103,353 A * | 4/1992 | Jove et al. | .................. | 360/67 |
| 5,204,789 A * | 4/1993 | Jove et al. | .................. | 360/67 |
| 5,327,303 A * | 7/1994 | Smith | .................. | 360/67 |
| 6,064,261 A * | 5/2000 | Stein et al. | .................. | 330/252 |
| 6,236,247 B1 | 5/2001 | Ngo | .................. | 327/110 |
| 6,341,046 B1 * | 1/2002 | Peterson | .................. | 360/67 |
| 6,404,574 B1 | 6/2002 | Barnett | .................. | 360/46 |
| 6,549,353 B1 * | 4/2003 | Teterud | .................. | 360/46 |
| 6,721,117 B1 * | 4/2004 | Briskin | .................. | 360/66 |
| 6,920,002 B1 * | 7/2005 | Sako et al. | .................. | 360/46 |
| 2003/0234996 A1 | 12/2003 | Ngo | | |
| 2004/0120065 A1 | 6/2004 | Takeuchi | | |

OTHER PUBLICATIONS

Copy of International Search Report mailed May 10, 2006 based on Int'l Application: PCT/US2005/039502.

* cited by examiner

*Primary Examiner*—Kenneth B. Wells
(74) *Attorney, Agent, or Firm*—Mark G. Lappin; Foley & Lardner LLP

(57) ABSTRACT

A write driver includes two field-effect/bipolar transistors with feedbacks between the drains/collectors and gates/bases, a write/read switch connected between the drains/collectors and a positive power supply, an impedance matching circuit connected to the drains/collectors to match both differential and common mode output impedance of the write driver to an input impedance of a flex circuit, a common mode output voltage control circuit coupled to the transistors, and a differential mode output voltage control circuit coupled to the transistors.

8 Claims, 3 Drawing Sheets

Write Driver Schematic Diagram

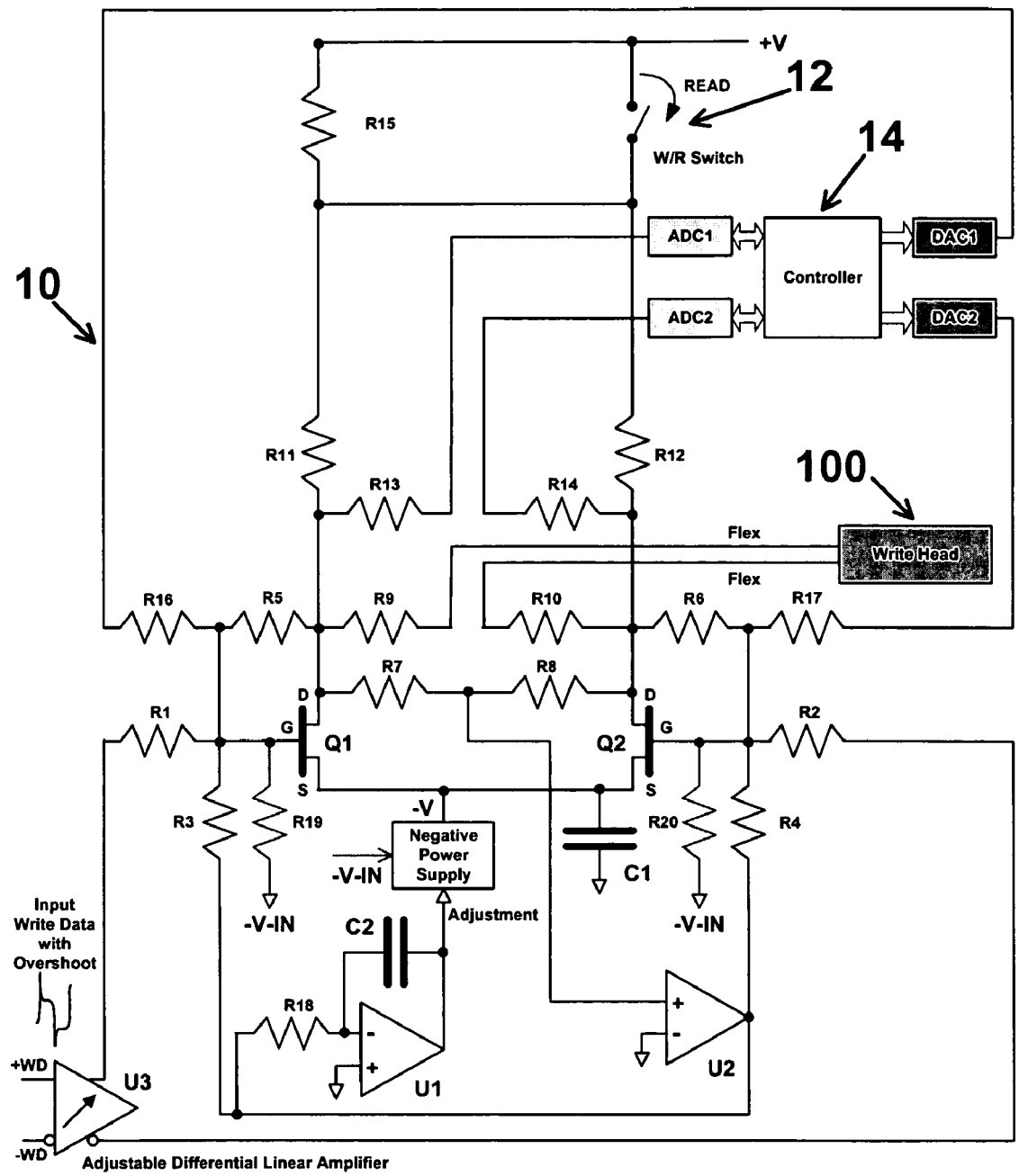
Figure 1: Write Driver Schematic Diagram

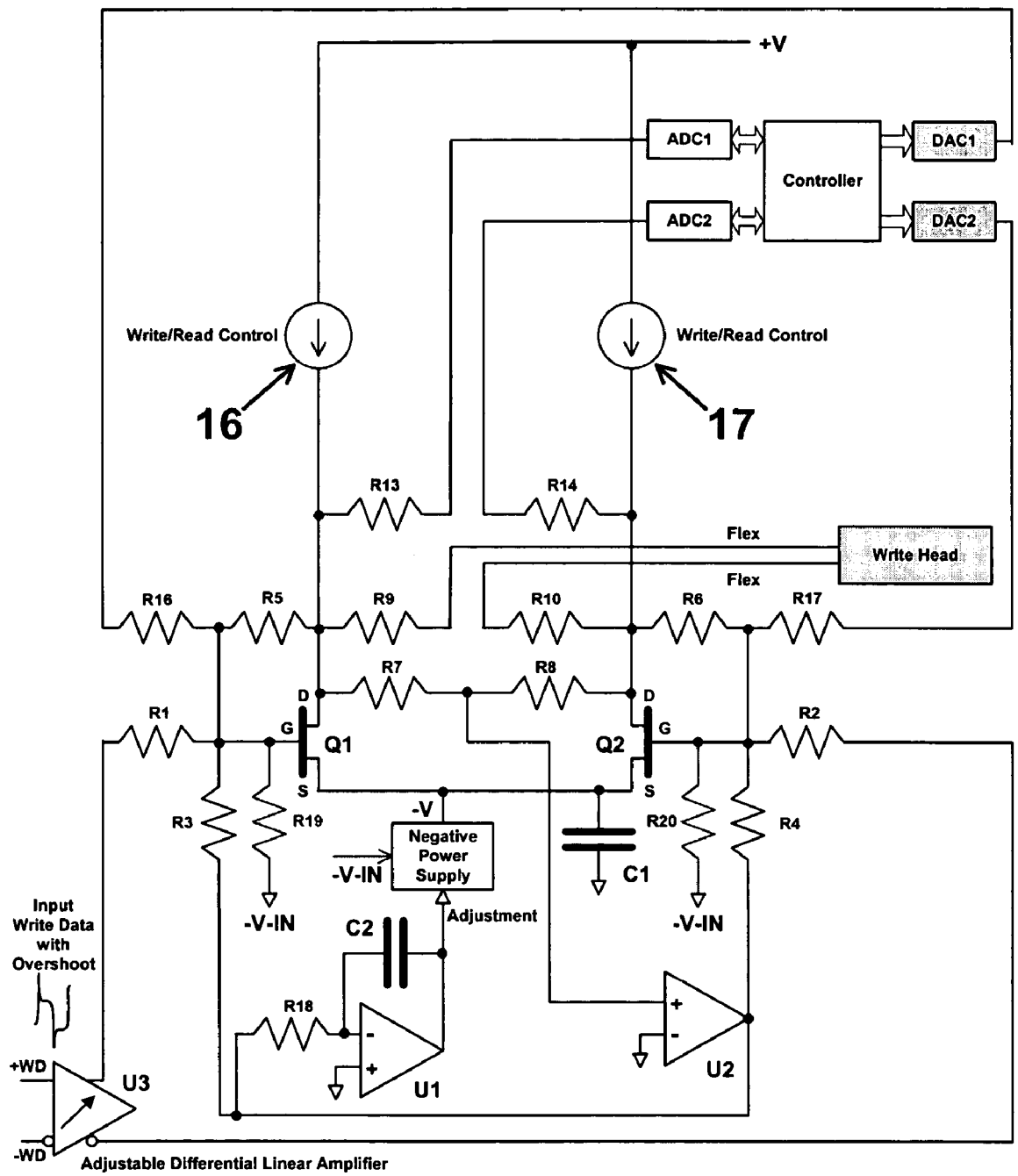
Figure 2: Write Driver Schematic Diagram

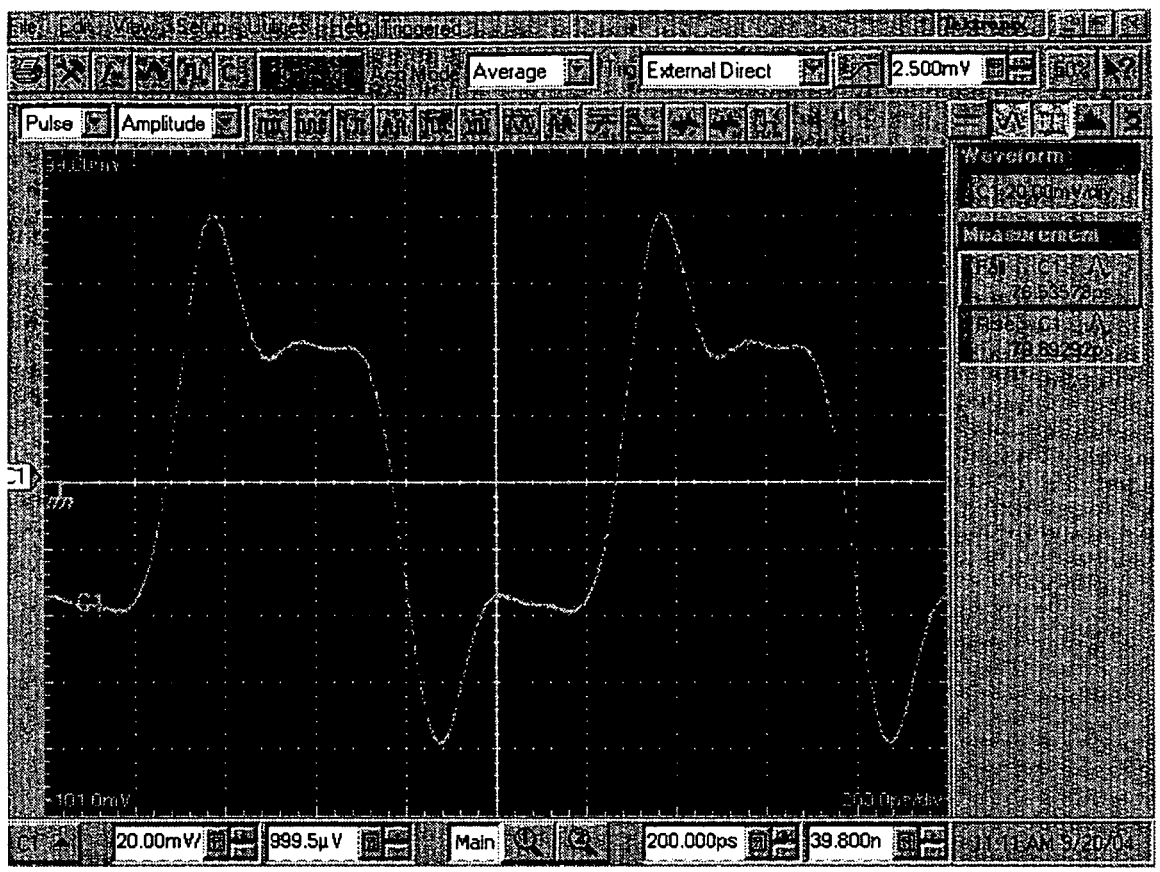
Figure 3: Waveform of Write Current (Frequency 1GHz, Overshoot 100% with PW 200 psec)

HIGH-SPEED WRITE DRIVER

FIELD OF THE INVENTION

The present invention relates generally to write drivers for magnetic recording devices such as disk drives, and more particularly, relates to high-speed write drivers.

BACKGROUND OF THE INVENTION

Write drivers for write heads of a magnetic disk drive are employed to provide a write current to the write heads. A flex/interconnect is generally used to connect the write driver to the write head. A write driver generally requires a wide bandwidth and a fast rise/fall time of the write current, an adjustable overshoot of the write current to compensate high frequency losses, an output impedance matched to the input impedance of the flex/interconnection, a low power consumption, and a fast recovery from read to write mode, etc.

Conventional techniques have been utilized to address these requirements, for example, using a switchable "H-Bridge", switchable differential transistors, and the like. However, these conventional approaches add the boost or overshoot of the write current at the output stage of the circuit. The disadvantage of this is that the write driver circuit needs extra transistors to be connected to the write head to adjust the overshoot. Those extra transistors increase the output capacitance of the write driver, and that in turn, make it difficult to achieve high bandwidth and to match the output impedance of the write driver to the input impedance of the interconnections.

Accordingly, there is a need for a write driver that not only has a wide bandwidth and a low power consumption, but also matches both differential and common mode output impedance to the impedance of the flex/interconnect.

SUMMARY OF THE INVENTION

The present invention provides a high-speed write driver for disk drives or another magnetic recording devices. The write driver is connected to a write head through flex interconnections. According to one preferred form of the present invention, the overshoot is added in the write input of the write driver instead of at the output stage as done in the prior art. According to another preferred form of the present invention, the write driver employs only two field-effect transistors (FETs) or bipolar junction transistors (BJTs) coupled to the write head through the interconnections. Field-effect transistors are used in the exemplary embodiments as described below, but a person skilled in the art should understand that bipolar transistors also can be used instead of the field-effect transistors.

The drains of the transistors are coupled to a positive power supply and the sources of the transistors are coupled to a negative power supply. In one preferred form, the drains are connected to the positive power supply through a resistor and a write/read switch, which are connected in parallel. In a write mode, the write/read switch is closed, and the resistor is bypassed. In a read mode, the write/read switch is opened, and the current goes through the resistor, and the resistor with a predetermined resistance value limits the current from the positive power supply to the transistors to a relatively small value, thereby to reduce the power consumption.

In one preferred form, a common mode voltage control circuit couples the drains of the two FETs to the gates and the sources of the transistors. The common mode voltage control circuit provides feedbacks from a common point between the drains of the two transistors to the gates and the sources of the transistors, thereby to adjust the common mode voltage at the drains to or close to 0V DC. In one preferred form, the feedback loop of the common mode voltage control circuit includes operational amplifiers to control the current over the gates of the transistors, and the voltage of the negative power supply, which provides negative voltage to the sources of the transistors, thereby to adjust the common mode voltage at the drains.

According to another preferred embodiment, a differential mode voltage control circuit is coupled to the drains and the gates of the two transistors for adjusting differential mode voltage between the two outputs. In one preferred form, the differential mode voltage control circuit includes two analog-to-digital converters (ADCs) respectively connected to the two drains of the transistors through resistors, a controller connected to the two ADCs, and two digital-to-analog converters (DACs) connected respectively to the controller. The DC voltage values at the drains of the transistors are transmitted to the ADCs, which transmit the signals to the controller. The controller calculates the adjustment that is needed for adjusting the differential voltage at the drains of the transistors to a value equal to or close to 0V DC, and sends the calculation result to the DACs respectively. The DACs transform the result signals received from the controller to output voltages, which are respectively applied to the gates of the two transistors, thereby to adjust the gate voltages, and which in turn, adjust the differential voltage at the drains of the transistors to or close to 0V DC. In one preferred form, the adjustment through the ADCs, the controller, and the DACs adjusts the DC voltage at each output of the write driver to or close to 0V DC. The write input is preferably turned off during the adjustment of the differential mode voltage. For example, the adjustment can be done during a read mode.

To match the output impedance of the write driver to the impedance of the flex interconnection circuitry, an extra resistor is connected between the drain and the terminal of the flex circuitry for each transistor. The resistance of the extra resistor is selected such that the sum of the resistance of this resistor and output impedance of the associated transistor is equal to one half of the differential input impedance of the flex circuitry. Because the transistor with negative feedback has a low output impedance and the resistance of the extra resistor is much larger than the output impedance of the transistor, the change of the output impedance of the transistor over the frequency range does not affect significantly the output impedance of the write driver. Thereby the output impedance of the write driver remains stable and in good match to the impedance of the flex circuitry in a wide frequency range.

According to one aspect of the present invention, the transistors have further feedback circuits connected to the drains and the gates providing negative feedbacks from the drains to the gates. According to another aspect of the present invention, the power supplies and/or the control circuits are selected and controlled such that the transistors work in linear stages.

BRIEF DESCRIPTION OF THE DRAWINGS

FIG. 1 is a schematic diagram of a write driver according to one preferred embodiment of the present invention;

FIG. 2 is a schematic diagram of a write driver according to another preferred embodiment of the present invention; and FIG. 3 is a waveform of a write current produced by a write driver constructed in accordance with the present invention.

DETAILED DESCRIPTION OF THE PREFERRED EMBODIMENTS

The present invention provides a high-speed write driver for disk drives. According to one aspect of the present invention, an overshoot is added in the input write signal of the write driver instead of at the output stage of the write driver as done in the prior art. According to another aspect, the write driver constructed according to the present invention employs only two transistors coupled to the write head through flex interconnections.

A schematic diagram of a write driver according to one preferred embodiment of the present invention is shown in FIG. 1. As shown in FIG. 1, the write driver 10 is connected to a write head 100 through flex interconnections. In one preferred embodiment, the write driver 10 includes two field-effect transistors Q1 and Q2 with negative feedback from drain to gate respectively through the resistors R5 and R6. Two pull-down resistors R19 and R20 which are respectively connected to the gates of the transistors Q1 and Q2 provide a way for feedback current to a negative voltage −V−IN. Two pull-up resistors R11 and R12, which are respectively connected to the drains of the two transistors Q1 and Q2, are connected to a power supply +V through a resistor R15 and a write/read (W/R) switch 12, which are connected in parallel. In use, DC current goes through the power supply +V, the pull-up resistors R11, R12, and through the transistors Q1 and Q2 to a negative power supply −V, which is connected to the sources of the transistors Q1 and Q2. The input write data with overshoot preferably is formed outside the write driver 10 and is transmitted to the write driver 10 through an adjustable differential linear amplifier U3, which is connected to the gates of the transistors Q1 and Q2 respectively through resistors R1 and R2.

A part of the DC current goes through the feedback resistors R5 and R6 to the associated gates of Q1 and Q2 and through two pull-down resistors R19 and R20 to the negative voltage −V−IN. Two bias resistors R3 and R4 provide connection to the output of an operational amplifier U2. The negative power supply voltage −V is selected such that drain-to-source voltages at Q1 and Q2 are sufficient to provide the required voltage level of the write signal that is to be provided by the write driver 10. For example, if required voltage level of the write signal is 10V peak-to-peak, the voltage −V is preferably in the range from −7V to −6V, and negative voltage −V−IN is preferably in the range below −8V (including −8V).

The write head 100 is connected to the drains of transistors Q1 and Q2 respectively via two flex interconnections and resistors R9 and R10. If the differential impedance of transmission lines in the flex circuitry is $R_f$, then, preferably, $R9+R10+2Z_d$ substantially equals to $R_f$, where $Z_d$ is the output impedance of the transistors Q1 and Q2. Because the value of $Z_d$ is small (in the order of 10 Ohms) and the resistance of the resistors R9 and R10 are relatively large (for example, 40 Ohms for each of R9 and R10) the variation of transistor output impedance $Z_d$ over the frequency range does not affect significantly the output impedance of the write driver 10. Thereby, the write driver output impedance matches the impedance of the flex circuitry in a wide frequency range.

The write driver 10 further includes two resistors R7 and R8 respectively connected to the drains of the transistors Q1 and Q2. An output common mode voltage control circuit is connected between a common point of the resistors R7 and R8 and gates and the sources of the transistors. The output common mode voltage control circuit includes an operational amplifier U2 having the positive input connected to the common point between the resistors R7 and R8. The negative input of the operational amplifier U2 is connected to the ground or 0V DC source. The operational amplifier U2 compares the output common mode voltage taken from the common point of the resistors R7 and R8 with the 0V DC at the negative input of the operational amplifier U2. The output of the operational amplifier U2 is connected to the gates of the transistors Q1 and Q2 respectively through resistors R3 and R4. If the voltage of the common point of the resistors R7, R8 differs from 0V DC, a negative feedback from the output of the operational amplifier U2 is transmitted respectively through the resistors R3 and R4 to the gates of the transistors Q1 and Q2 to adjust the voltage on the gates of the transistors Q1 and Q2 to minimize this difference.

Preferably, the values of the resistors R3 and R4 are selected such that when the output common mode voltage is close to 0V DC, the output voltage of the operational amplifier U2 is close to 0V DC. The adjustment also compensates the changes caused by the changes of temperature.

Because the gate-to-source voltage of the transistors Q1 and Q2 can vary with temperature and also because by using different transistors Q1 and Q2, the system may have different output common mode voltage, in alternative embodiments, the system may have 0V DC output common mode voltage at the common point with the output voltage of the operational amplifier U2 far from 0V DC. To prevent saturation of the amplifier U2 and to avoid the possibility that the output voltage of the operational amplifier U2 reaches its limit, an extra feedback loop is provided. The extra feedback loop includes an operational amplifier U1. The output of the operational amplifier U2 is transmitted to the negative input of the operational amplifier U1 via a resistor R18. The positive input of the operational amplifier U1 is connected to the ground. The output of the operational amplifier U1 is connected to the negative input of the operational amplifier U1 through a capacitor C2 to provide a feedback from the output to the negative input. The output of the operational amplifier U1 is also connected to the negative power supply −V for adjustment of the negative power supply output voltage −V. In operation, the operational amplifier U1 compares the output voltage of the operational amplifier U2 with 0V DC at the positive input of the operational amplifier U1, and, based on the result of comparison, adjusts the voltage of the negative power supply −V to keep the output voltage of U2 close to 0V DC. In one preferred form as shown in FIG. 1, a bypass capacitor C1 connects the sources of the transistors Q1 and Q2 to the ground to filter high frequency signals out of the circuit.

The common mode voltage adjustment through the resistors R7 and R8 and the operational amplifiers U1 and U2 results in the common mode impedance of the transistors Q1 and Q2 close to 0 Ohm. Because the values of the resistors R9 and R10 are relatively large, the common mode voltage adjustment through the resistors R7 and R8 and the operational amplifiers U1 and U2 does not affect significantly the output common mode impedance. Therefore, the write driver 10 provides not only a good differential impedance match but also a good common mode impedance match.

As seen from FIG. 1, the common mode voltage adjustment does not prevent the appearance of a differential DC voltage at the drains of the transistors Q1 and Q2 due to the mismatch of these two transistors. Such differential voltage will create a DC current through the write head 100, and/or a DC magnetic field, and/or distortions of writing signals. To reduce or eliminate the differential voltage between the drains of the transistors, according to one preferred embodiment, the write driver 10 further includes feedback loops to adjust the differential voltage at the drains of the transistors Q1 and Q2 to a value equal to or close to 0V DC. In one preferred form, the feedback loop, which is connected to the drain and the gate of the transistor Q1, includes a resistor R13, an analog-to-digital converter ADC1, a controller 14, a digital-to-analog converter DAC1, and a resistor R16, all of which are connected in series. The feedback loop, which is connected to the drain and the gate of the transistor Q2 includes a resistor R14, an analog-to-digital converter ADC2, the controller 14, a digital-to-analog converter DAC2, and a resistor R17, all of which are connected in series.

It is preferred that the write input at the adjustable differential linear amplifier U3 is turned off during the adjustment of the differential voltage. The adjustment can be done, for example, during a read mode, in which the output of the amplifier U3 is turned off. The DC voltage values at the drains of the transistors Q1 and Q2 are respectively transmitted to the analog-to-digital converters ADC1 and ADC2 through the resistors R13 and R14. The analog-to-digital converters ADC1 and ADC2 measure the DC voltage and send the output signals to the controller 14. The controller 14 calculates the adjustment that is needed for adjusting the differential voltage at the drains of the transistors Q1 and Q2 to a value equal to or close to 0V DC, and sends the result to the digital-to-analog converters DAC1 and DAC2. The digital-to-analog converters DAC1 and DAC2 transform the result signals received from the controller 14 to output voltages, which are applied to the gates of the transistors Q1 and Q2 respectively through the resistors R16 and R17. The output voltages of the digital-to-analog converters DAC1 and DAC2 supply extra bias to the gates of the transistors Q1 and Q2, which, in turn, adjust the differential voltage at the drains of the transistors Q1 and Q2 to a value equal to or close to 0V DC.

The write/read switch 12 preferably is open when the write driver 10 is in a read mode. The resistance of the resistor R15 is preferably large, which limits the drain currents of the Q1 and Q2 to relatively small values. The transistors Q1 and Q2 are in linear operation mode with small drain currents. In the read mode, the drain currents of the transistors Q1 and Q2 can be much lower than the currents in a write mode. As a result, in the read mode, the write driver 10 consumes much less electrical power than in the write mode.

In an alternative form, the resistors R11 and R12 and the W/R switch 12 can be substituted by current sources 16 and 17. FIG.2 shows an embodiment with current sources 16 and 17 connected to the drains of the transistors. In this alternative embodiment, switching the write driver 10 between the write and read modes can be replaced by switching the current values generated by the current sources.

The input write signal is preferably formed outside the write driver 10 with selected values of amplitude, overshoot amplitude, and overshoot width, and is transmitted to the write driver 10 through the adjustable differential linear amplifier U3. The input write signal is amplified and adjusted by the amplifier U3. The resistance of the resistors R1 and R2 are selected such that the output impedance of the differential linear amplifier U3 and the resistors R1 and R2 matches to the input impedance of the circuit measured at the gates of the transistors Q1 and Q2. The amplifier U3 suppresses common mode distortions such as DC shift, and the second and fourth harmonics of the input write signal.

The field-effect transistors Q1 and Q2 can be Metal-Oxide-Semiconductor Field-Effect Transistors, for example, PMOS or NMOS, or other transistors. The write driver 10 also can use two bipolar junction transistors instead of the two field-effect transistors Q1 and Q2. Correspondingly, if using two bipolar junction transistors to replace the two field-effect transistors, the circuits that are connected to the drains, the sources, and the gates of the field-effect transistors should be connected to the collectors, the emitters, and the bases of the bipolar junction transistors.

The write driver 10 constructed in accordance with the present invention can achieve a bandwidth up to 6 GHz and a write data speed up to above 5 Gb/sec. FIG. 3 shows a waveform of a write current with frequency 1 GHz and 100% overshoot with PW of the overshoot 200 psec produced by a write driver constructed according to the present invention.

While the claimed invention has been described in detail and with reference to specific embodiments thereof, it will be apparent to one of ordinary skill in the art that various changes and modifications can be made to the claimed invention without departing from the spirit and scope thereof. Thus, for example those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A write driver having first and second nodes for connection to a write head, the write driver comprising: first and second transistors each having a first terminal, a second terminal, and a base terminal, wherein said first terminals of said two transistors are respectively coupled to said first and second nodes; a common mode voltage control circuit coupled to said each transistor, said common mode voltage control circuit comprising a feedback circuit for each transistor between said first terminal and at least one of said base terminal and said second terminal to adjust a common mode voltage at said first terminals; wherein the common mode voltage control circuit further comprises: a first operational amplifier having a positive input connected to a common point between the first terminals, a negative input connected to the ground, and an output connected to the base terminals of the transistors; and a differential mode voltage control circuit coupled to said each transistor, said differential mode voltage control circuit comprising a feedback circuit for each transistor between said first terminal and said base terminal to adjust a differential mode voltage at said first terminals.

2. A write driver according to claim 1, wherein the write driver further comprises two resistors connected respectively between the common point and the first terminals.

3. A write driver according to claim 1, wherein the output of the first operational amplifier is further connected to a negative input of a second operational amplifier, and wherein a positive input of the second operational amplifier is connected to the ground, and an output of the second operational amplifier is connected to a negative power supply, which is connected to the second terminals of the transistors, whereby the negative power supply is adjusted through the common mode voltage control circuit to adjust the common mode voltage of the first terminals.

4. A write driver having first and second nodes for connection to a write head, the write driver comprising: first and second transistors each having a first terminal, a second terminal, and a base terminal, wherein said first terminals of said two transistors are respectively coupled to said first and second nodes; a common mode voltage control circuit coupled to said each transistor, said common mode voltage control circuit comprising a feedback circuit for each transistor between said first terminal and at least one of said base terminal and said second terminal to adjust a common mode voltage at said first terminals; and a differential mode voltage control circuit coupled to said each transistor, said differential mode voltage control circuit comprising a feedback circuit for each transistor between said first terminal and said base terminal to adjust a differential mode voltage at said first terminals; wherein the differential voltage control circuit comprises two analog-to-digital converters respectively connected to the first terminals of the transistors, and outputs of the two analog-to-digital converters are respectively connected to a controller, and the controller is connected to inputs of two digital-to-analog converters, and outputs of the digital-to-analog converters are respectively connected to the base terminals of the transistors, whereby the differential voltage control circuit controls the voltage on the first terminals of the transistors.

5. A write driver having first and second nodes for connection to a write head, the write driver comprising: two transistors, each including three terminals: a first terminal, a second terminal, and a base terminal, each transistor having feedback between the base terminal and the first terminal, wherein said first terminals of said two transistors are respectively connected to said first and second nodes; and a resistor and a write/read switch connected in parallel, wherein one end of the resistor and the write/read switch is connected to the first terminals and the other end is connected a positive power supply, and wherein the write/read switch is adapted to be placed in a closed position when the write driver is in a write mode, and the write/read switch is adapted to be placed in an opened position when the write driver is in a read mode; wherein the write driver further comprises a common mode voltage control circuit, which comprises a feedback circuit coupled to the first terminal, and at least one of the base terminal and the second terminal of said each transistor to adjust a common mode voltage at said first terminals of said two transistors; wherein said common mode voltage control circuit further comprises: a first operational amplifier having a positive input connected to a common point between the first terminals, a negative input connected to the ground, and an output connected to the base terminals of the transistors.

6. A write driver according to claim 5, wherein the write driver further comprises two resistors connected respectively between the common point and the first terminals.

7. A write driver according to claim 5, wherein the output of the first operational amplifier is further connected to a negative input of a second operational amplifier, and wherein a positive input of the second operational amplifier is connected to the ground, and an output of the second operational amplifier is connected to a negative power supply, which is connected to the second terminals of the transistors, whereby the negative power supply is adjusted by said common mode voltage control circuit to adjust the common mode voltage at the first terminals.

8. A write driver having first and second nodes for connection to a write head, the write driver comprising: two transistors, each including three terminals: a first terminal, a second terminal, and a base terminal, each transistor having feedback between the base terminal and the first terminal, wherein said first terminals of said two transistors are respectively connected to said first and second nodes; and a resistor and a write/read switch connected in parallel, wherein one end of the resistor and the write/read switch is connected to the first terminals and the other end is connected a positive power supply, and wherein the write/read switch is adapted to be placed in a closed position when the write driver is in a write mode, and the write/read switch is adapted to be placed in an opened position when the write driver is in a read mode; wherein the write driver further comprises a differential voltage control circuit, which comprises a feedback circuit connected between the first terminals and the base terminals to adjust a differential voltage between the first terminals; wherein said differential voltage control circuit comprises two analog-to-digital converters connected respectively to the first terminals of the transistors, and outputs of the two analog-to-digital converters are connected to a controller, and the controller is connected to inputs of two digital-to-analog converters, and outputs of the digital-to-analog converters are connected respectively to the base terminals of the transistors.

* * * * *